April 2, 1935.   N. B. CARTER   1,996,611
HITCHING DEVICE FOR TRACTORS, HORSES, ETC
Filed Sept. 18, 1934
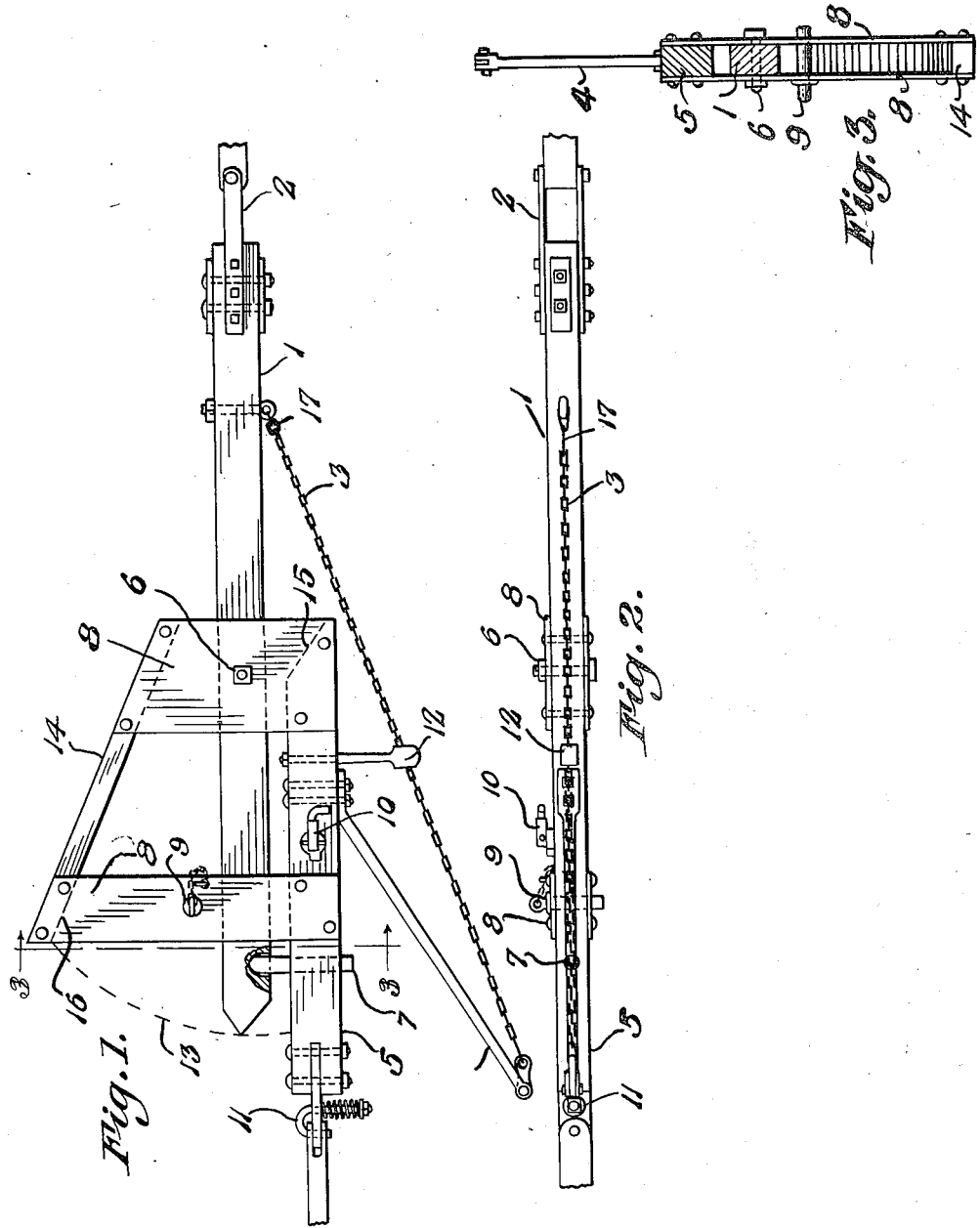
Inventor
NATHAN B. CARTER.
By Howard J. Whelan
Attorney Patented Apr. 2, 1935

1,996,611

UNITED STATES PATENT OFFICE 1,996,611

HITCHING DEVICE FOR TRACTORS, HORSES, ETC.

Nathan B. Carter, St. Michaels, Md.

Application September 18, 1934, Serial No. 744,585

2 Claims. (Cl. 280—33.44)

This invention refers to hitching devices for tractors and horses and has among its objects to provide a device of this nature that may be attached to any conventional form or make of tractor, that will make a square turn, that will be particularly applicable to binders and will cause the same to stand still momentarily when the turn is being made for a return trip or otherwise. Another object is to have the construction of the device simple, flexible and such as to permit it to be easily installed. Other objects will become apparent as the invention is more fully set forth.

It is difficult to make the ordinary type of hitch used with a tractor or horses permit a square turn to be made when attached to a binder, and while devices have been made to permit the square turns to be right or left in the same hitch, such are subject to disadvantages in the traction effect. In this device the arrangement for the square turn is made on one pre-determined side and in doing so the work and turn is effectively accomplished.

In the drawing which illustrates by way of example an embodiment of this invention:

Figure 1 is a general plan view of a hitching device to be used between a tractor and binder and embodies this invention.

Figure 2 is a side view of the device shown in Figure 1.

Figure 3 is an end view of Figure 1 along the line 3—3.

Similar reference characters refer to similar parts throughout the drawing.

In the construction indicated 1 is the main draw-bar of the hitching device that connects with the tractor or team of horses through the straps 2. The draw-bar is provided with a side-draft chain 3 and turnbuckle 17 attached to its side and braced to pull sidewise with a side-arm 4 attached to sub-draw-bar 5. The main draw-bar is provided with a hole for a king-bolt 6, and also has the slip-pin 7 loosely mounted on one end as indicated. A plate frame 8 is provided and is preferably of the construction shown in the drawing. It has a key-bolt 9 for controlling the sidewise movement of the main draw-bar 1 on one side, while the sub draw-bar 5 mounted on the same plate frame 8 in a rigid manner restricts its movement in the opposite direction.

The sub draw-bar 5 is provided with a trucking-pin 10 and a hitch hook 11 for securing the sub draw-bar to a binder. A guide 12 is mounted on the plate frame for guiding the side-draft chain 3 and keeping it out of the way.

The mode of operation is simple. The tractor or horses are connected to the straps 2 and the binder at 11. The king bolt 6 and key bolt 9 are in position and cause the tractor to pull the binder straight ahead. At the corners where a square turn is made, the key bolt 9 is lifted out and the main draw-bar 1 is pulled through the arc shown by the dotted line 13. This releases the slip pin 7 from the main draw-bar 1. The side-draft chain 3 slacks up. The main draw-bar 1 then strikes the side of the plate frame 8 at 15 and 16 and turns the sub draw-bar 5 and binder on a square turn. Then the tractor proceeds to pull the binder as before.

As the hitch device is used in the field, the key bolt 9 prevents any undue sidewise movement and the side draft chain 3 keeps the sub draw-bar 5 and plate frame 8 from erratic movement. This chain takes up the pull when not evenly distributed on the main draw-bar 1. The slip pin 7 also serves to guide, and keep the two draw-bars in the proper relation with each other. The plate frame is preferably made with the front portion restricted in width while the rear portion is widened by providing a slanting side 14 thus enabling the arc travel of the main draw-bar. The placement of the key bolt 9 is towards the slanting side. The spacing of the top and bottom plates of the plate frame is made sufficient to permit the proper free movement of the main draw-bar 1 between them, while the sub draw-bar 5 is securely held thereby and becomes, as it were, a part of the plate frame 8.

It will be noted that the main draw-bar 1 will only swing in one side direction and prevents any error or confusion arising on that account because its action is positive in regard thereto. The draft chain 3 through its manner of angular connection with the side arm bracket 4 distributes the stresses if acting towards the other side direction and prevents the main draw-bar 1 from being unduly strained.

While but one form of the construction of this invention is indicated in the drawing, it is not desired to limit this application for patent to this particular construction as it is appreciated that other constructions might be used that would employ the same principles and come within the scope of the appended claims.

What I claim is:—

1. A device of the class described comprising in combination, a main draw-bar, a sub draw-bar, a plate frame for securely holding the sub-draw-bar in rigid attachment thereto, means for holding the main draw-bar loosely to said plate frame, means for adjustably restricting the movement of the main draw-bar, a draft chain means for providing a loose connection in one direction and restraining connection in the opposite direction between the main draw-bar and the sub draw-bar, means for permitting a square corner movement of the main draw-bar in the plate-frame when the said means for adjustably restricting its movement is detached, and means for attaching the main draw-bar to a tractor or team of horses, and means for attaching the sub draw-bar to an agricultural machine to be pulled thereby.

2. A device of the class described comprising in combination, a main draw-bar, a sub draw-bar, a plate frame for securely holding the sub draw-bar in rigid attachment thereto, means for holding the main draw-bar loosely to said plate frame, means for adjustably restricting the movement of the main draw-bar, a draft chain means for providing a loose connection in one direction and restraining connection in the opposite direction between the main draw-bar and the sub draw-bar, means for permitting a square corner movement of the main draw-bar in the plate-frame when the said means for adjustably restricting its movement is detached, a slip-pin for interconnecting the draw-bars loosely together, a guide for said draft-chain mounted on the said plate frame, and means for attaching the main draw-bar to a tractor or team of horses, and means for attaching the sub draw-bar to an agricultural machine to be pulled thereby.

NATHAN B. CARTER.